No. 705,734. Patented July 29, 1902.
A. A. BROOKS & G. A. WATSON.
MAGAZINE PLATE HOLDER.
(Application filed Apr. 24, 1901.)
(No Model.)  4 Sheets—Sheet 1.
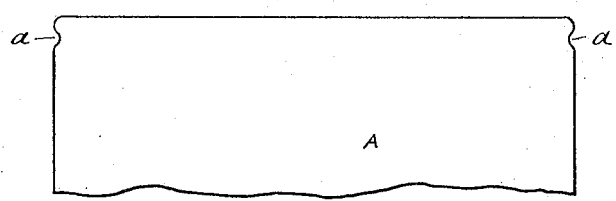
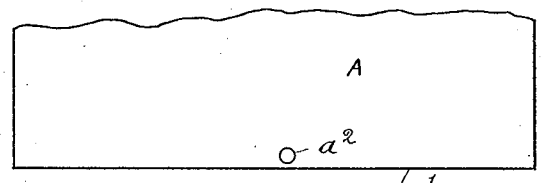
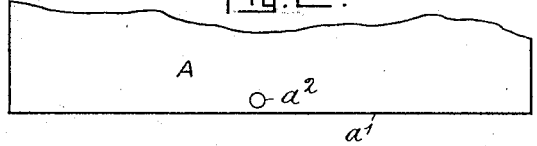
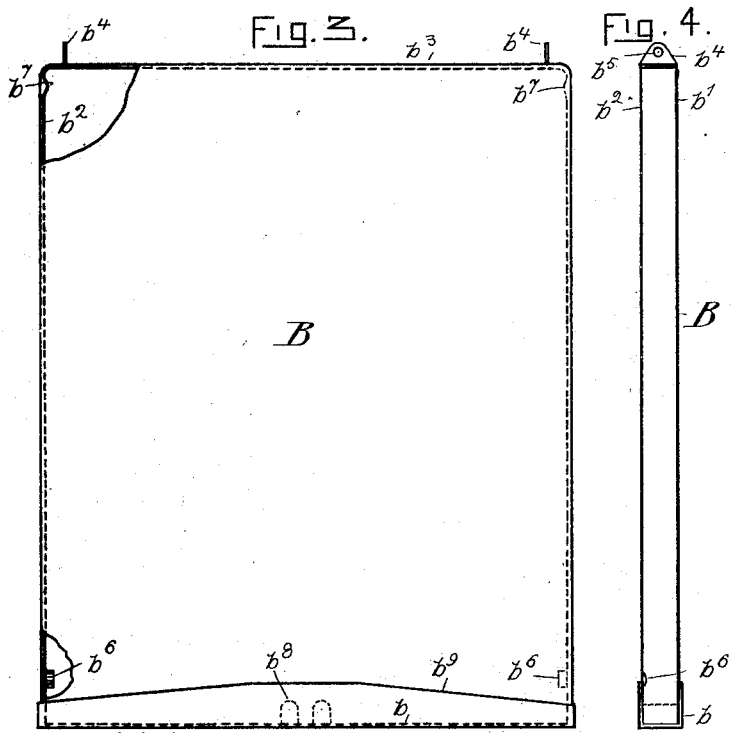
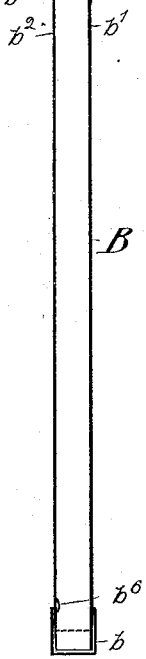
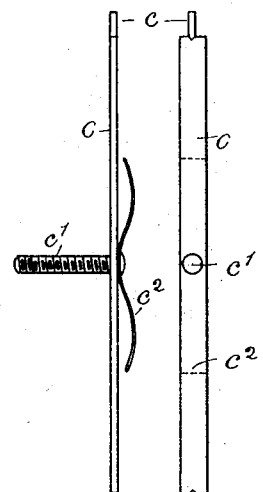
WITNESSES.
M. V. Perris
Anna P. McCole.
INVENTORS
A. A. BROOKS.
G. A. WATSON.
BY
Edward P. Thompson.
Attorney
THE NORRIS PETERS CO., PHOTO-LITHO., WASHINGTON, D. C.

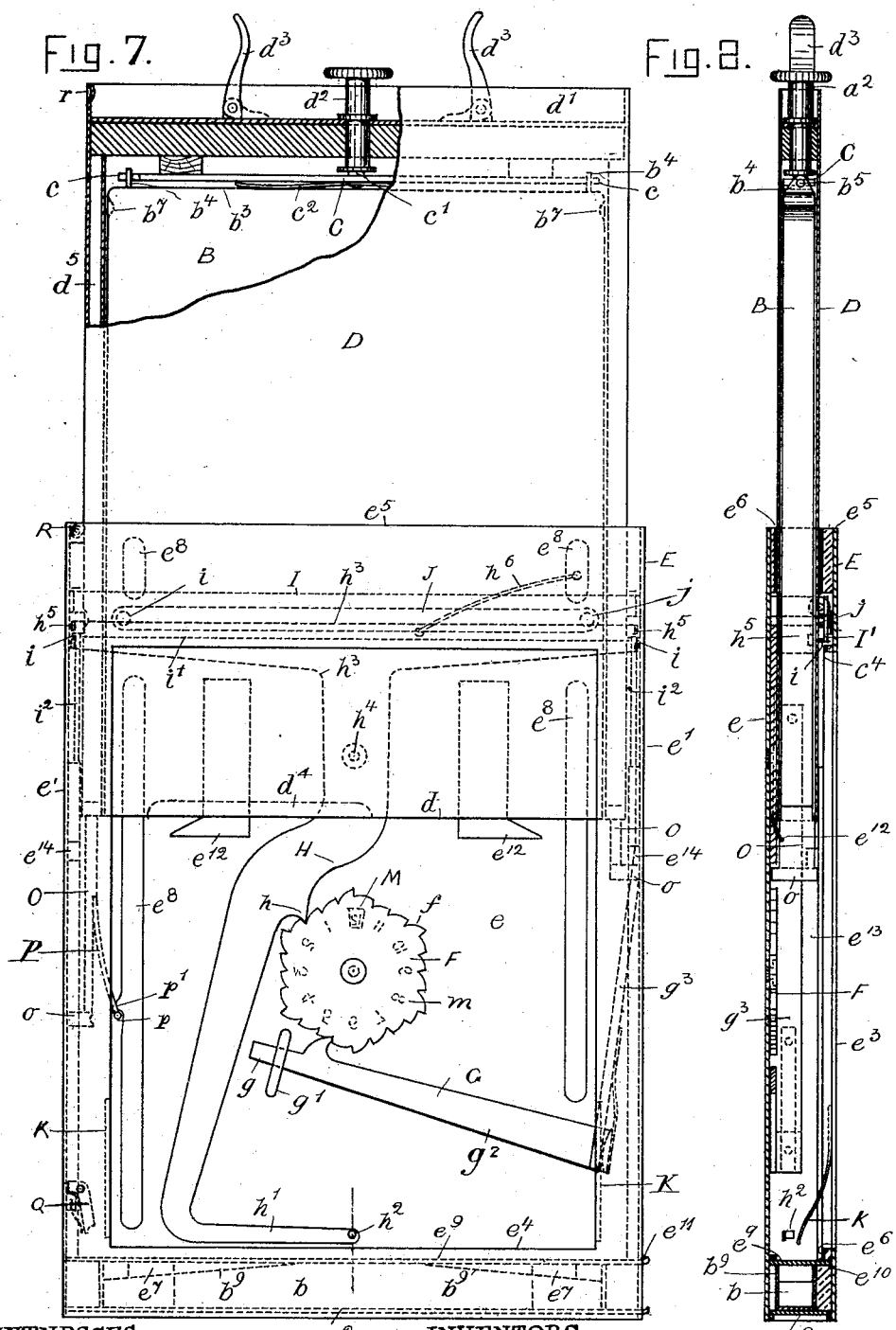

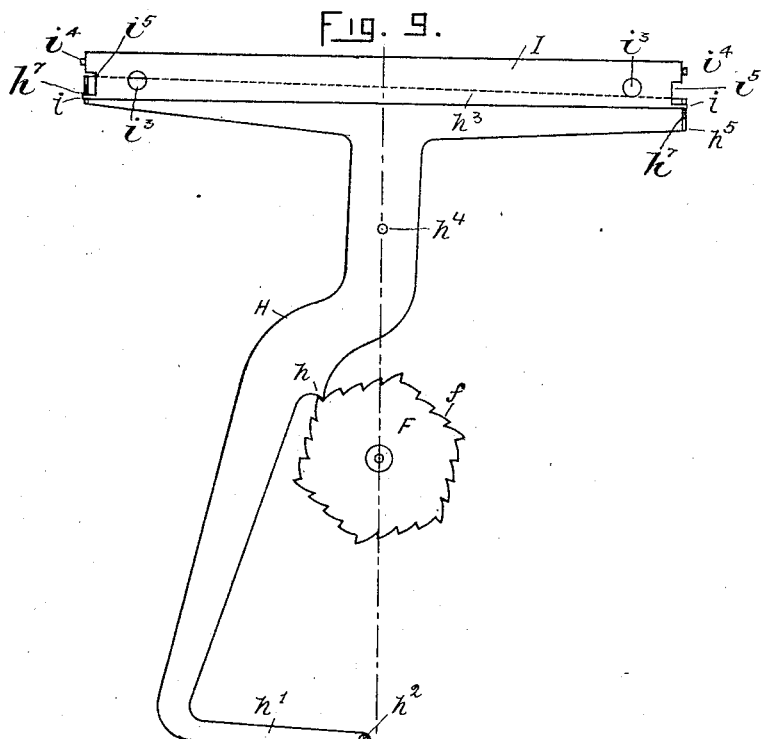
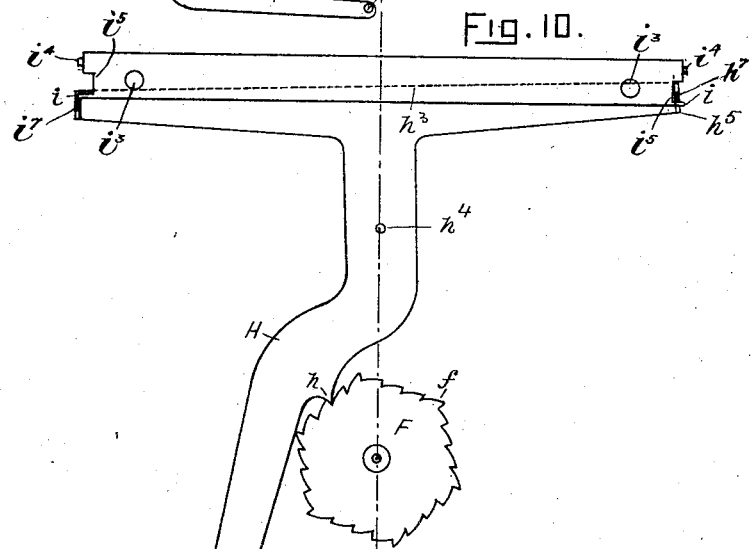
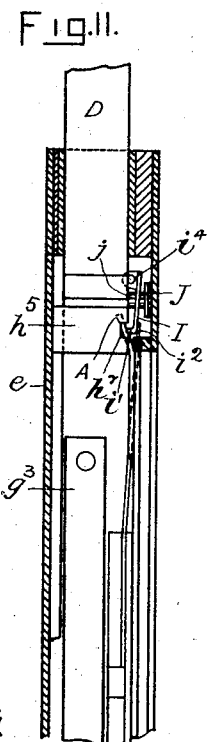
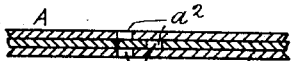

No. 705,734. Patented July 29, 1902.
A. A. BROOKS & G. A. WATSON.
MAGAZINE PLATE HOLDER.
(Application filed Apr. 24, 1901.)
(No Model.) 4 Sheets—Sheet 4.
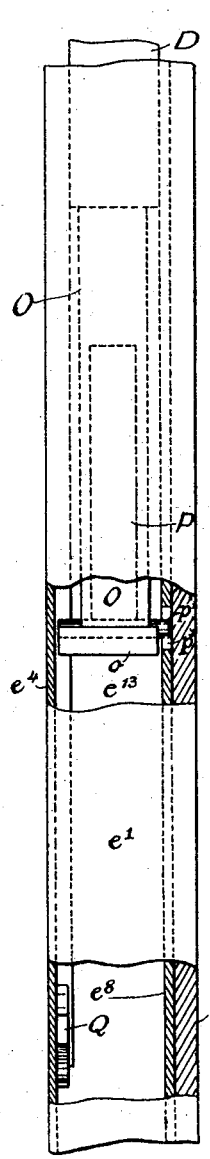
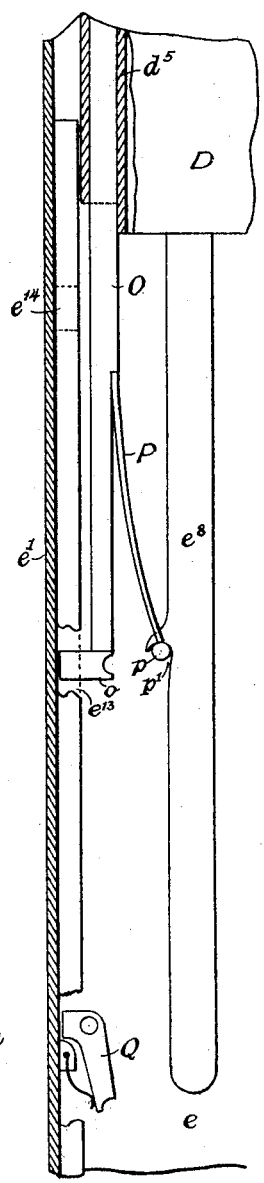
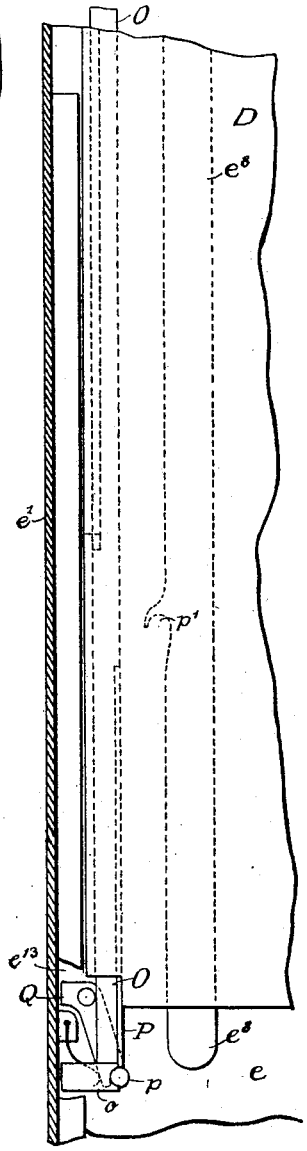

UNITED STATES PATENT OFFICE.

ARTHUR AUGUSTUS BROOKS AND GEORGE ANDREW WATSON, OF LIVERPOOL, ENGLAND.

MAGAZINE PLATE-HOLDER.

SPECIFICATION forming part of Letters Patent No. 705,734, dated July 29, 1902.

Application filed April 24, 1901. Serial No. 57,277. (No model.)

*To all whom it may concern:*

Be it known that we, ARTHUR AUGUSTUS BROOKS and GEORGE ANDREW WATSON, subjects of the King of Great Britain and Ireland, and residents of Liverpool, in the county of Lancaster, England, have invented certain new and useful Improvements in Magazine Plate-Holders, of which the following is a specification.

This invention relates to photographic cameras, and especially to that part of the camera in which the sensitized plates or films are contained and exposed to the object through the lens and usually termed "exposure-frame and change-box;" and our invention consists in a new constructive arrangement which forms a combined change-box, film-case and exposure-frame by the construction, arrangement, and use of which a dark room is only required by the operator for the purpose of developing and fixing the image on the films after exposure, as in accordance with the system under which the operations are carried out films to a convenient number are packed in cases adapted to fit in the change-box and each case is adapted to be retained therein until all the films have one by one been withdrawn, exposed, and returned to the case again while in the camera or change-box, which case can then be removed and a fresh one containing films can be substituted for it. After the films have been removed from the case after exposure, which is effected in a dark room, the case, being cheaply made, is not further required.

The chief object of this invention is to obviate the necessity of a dark room for the purpose of charging the camera, exposure-frame, or change-box, especially when a large number of films are required for immediate use.

In accordance with the system upon which our invention is based we first adapt the already sensitized films of any standard size to a case or magazine formed to hold and to retain, say, one dozen such films. We make an exposure-frame in which the light-excluding sliding cover is formed as a hollow case or sheath adapted to receive the said film-case without the lid or cover thereof and in which by means of suitable mechanism provided the lid of the film-case is first removed without admitting light to the said exposure-frame or change-box and the plates or films are exposed to the object through the lens and received again into the film-case by the sliding in and out of the said sliding cover. When all the parts composing the exposure-frame or change-box are assembled and the latter is attached to the back of the camera in the usual way, in order to expose a film the slide is drawn out and a film is left behind in the exterior frame or case of the exposure-frame or change-box, and upon depressing the slide the said film is forced flat against the front rim of the frame around the exposure-aperture. After exposure in order to receive the film back again into the film-case the slide is again drawn out, and upon a second time depressing it the film is guided into the film-case. The operation of exposing a film and taking it back into the film-case again is completed in four movements in and out of the slide.

In the drawings attached hereunto, Figures 1 and 2 represent in plan the films adapted for use in our improved apparatus. Fig. 3 represents an elevation of our improved film-case, and Fig. 4 a vertical cross-section thereof. Figs. 5 and 6 represent two views of an attachment used in connection with the film-case and exposure-frame. Fig. 7 represents a front elevation of our improved exposure-frame and change-box, and Fig. 8 a vertical cross-section of the same through the center. Figs. 9 and 10 represent the mechanism in the two extreme positions it assumes. Fig. 11 represents an enlarged cross-section of part of the change-box. Fig. 12 represents in section several superposed films on an exaggerated scale. Fig. 13 represents an enlarged view, with the front side of the casing removed, of the mechanism for preventing the withdrawal of the slide when all the films have been exposed, as shown in dotted lines on the left of Fig. 7, with the slide partly withdrawn. Fig. 14 represents the same, but with the slide pushed home. Fig. 15 is a side elevation, partly in section, of a portion of the change-box, showing the same parts and in the same relative positions as Fig. 13. Fig. 16 is a bottom plan view of certain details.

The change-box illustrated in the drawings is more particularly adapted for flexible sensitized thin celluloid plates, usually known as "films" in contradistinction to sensitized glass plates, usually termed "plates." By means of a slight modification of the film-case glass plates can be used in place of the celluloid films.

Referring first to the films, we use thin flat sensitized plates A, of celluloid of standard sizes, having the top corners slightly rounded off and a rounded notch $a$, formed in opposite sides immediately below the said corners. Close to the bottom edge $a'$ we pierce a small hole $a^2$ in each film, and we have two sets of films, in one set of which the holes are pierced a short distance—say equal to the diameter of the hole—to one side of those in the other set or right and left with respect to the sensitized surface of the film. In assembling the films in the case they are alternately arranged or superposed, so that the holes in alternate films only come opposite.

Referring now to the film-case B, Figs. 3 and 4, it is preferably made of light metal—say tin-plate or thin brass—and consists of a rectangular box just wide enough and long enough to receive the films and of sufficient depth to hold easily, say, twelve films and a thin metal blank placed at the back of the last film and is fitted with a light-proof lid or cap $b$. The film-case B is preferably made in two parts $b'$ $b^2$, Figs. 3 and 4, which fit one inside the other, so as to be light-proof at the joint, and in order to insure this they may be covered by a thin paper label gummed on. Upon the top edge $b^3$ of the film-case are formed two ears $b^4$, which are preferably pressed up in forming the back $b'$ out of the corner of the sheet and are pierced each with a hole $b^5$ for the purpose hereinafter set forth. The back $b'$ of the film-case has also two convex projections $b^6$, located one at each side a short distance from the bottom edge. The front $b^2$ of the film-case is formed with two internal swellings $b^7$, one at each side near to the top corners, for the purpose of engaging the notches $a$ of the films. Preferably two slots $b^8$ are also made in the front $b^2$, opening out to the bottom edge, so as to come opposite the holes $a^2$ in the films, or one slot large enough to expose both the holes $a^2$ in the films, or the films may project beyond the bottom edge of the film-case.

There is formed a cross-bar C, Figs. 5 and 6, having reduced ends $c$ of such dimensions that it can engage both the holes $b^5$ in the ears $b^4$ of the film-case B at the same time. This bar C is provided with a screwed stud $c'$, fixed centrally, and has preferably a spring $c^2$, fixed beneath, so that when engaged in the ears $b^4$ it is held by the spring in position, with its stud in the plane of the case.

The lid or cap $b$, Figs. 3 and 4, has its edges $b^9$ formed sufficiently prominent for the purpose of engaging stops, hereinafter referred to, while the cap is on the film-case. The lid is formed a good fit, so as to exclude the light, and may have its interior lined or partly lined with plush, felt, or the like in order to insure its being light-proof.

With reference to the hollow box-slide D, Figs. 7 and 8, it is formed to receive the film-case B and is adapted to slide in an outer case E, in which the films are exposed in the camera. The said slide D consists of a light, preferably metal, case, having an open bottom $d$ and made light-proof upon every other side. It is just large enough to take in the film-case B and bar C, but without the cap $b$. The upper end $d'$ is preferably recessed, and in the center thereof is mounted a rotatable nut $d^2$, capable of receiving the screwed stud $c'$ of the bar C. Two finger-pieces $d^3$, preferably hinged so as to fold down, are fixed to the slide D at the upper end for the purpose of facilitating the sliding of the slide D in and out of the outer case E. The back of the slide D has its bottom edge cut away, as indicated by dotted lines at $d^5$, for the purpose hereinafter set forth.

Referring now to the outer case E, Figs. 7 and 8, it is preferably made chiefly of sheet metal—brass or aluminium plate, for instance—and is formed with a closed back $e$ and sides $e'$, a sliding door $e^2$ for the bottom side, and an open front $e^3$, having a rabbeted frame $e^4$. The case E is adapted to receive the slide D, the top end $e^5$ being left open to take in the said slide, the opening being rendered light-proof by giving the slide a sliding fit therein and by lining the inside bearing-surface with plush $e^6$ or equivalent material. The sides of the case E are internally channeled, as represented in Fig. 8. In the bottom of the case E stops $e^7$ are disposed, so that the edges $b^9$ of the cap $b$ bear against the said stops and retain the said cap between the stops $e^7$ and the door $e^2$. Ribs or strips $e^8$ are formed upon the back $e$ in order to prevent the slide D from rubbing or touching the inside surface and mechanism thereof. Immediately above the stops $e^7$ is a movable support, preferably consisting of a thin metal slide $e^9$, which is held in position in grooves $e^{10}$, Fig. 8, and which can be inserted and withdrawn through a slot $e^{11}$ in one side of the case E. Flat plate-springs $e^{12}$, bent so that their free ends approach the open front of the case E, are fixed to the back $e$ of the said case.

The mechanism for controlling the withdrawal, the exposing, and the return of the films with respect to the film-case preferably consists of the arrangement of the parts as follows: Referring to Figs. 7 to 11 of the drawings, about the center of the back $e$ of the case E is mounted internally a rotatable toothed cam-wheel F, preferably of hexagonal form and having twenty-four inclined teeth $f$. A long pawl G, having an extension $g$, which slides in a guide $g'$, engages with the teeth of the cam, its other end $g^2$ being attached to a long spring-bar $g^3$, which is fixed at its opposite end in the groove of one of the sides $e'$ of the case E, the spring being curved and set toward the cam, so that when straightened out the pawl is drawn back and the cam rotated to the extent of one tooth. Pivoted to the back $e$ is a depending flat finger or lever H, having a nose $h$, which is adapted to engage in the teeth of the cam and to ride over them when the cam rotates. The lever H continues past the nose $h$ until it is close to the metal slide $e^9$ and is formed with an elbow and continuation $h'$, terminating with a stud $h^2$ upon its front face. The continuation $h'$ forms a spring and is slightly set forward at the tip for the purpose hereinafter set forth. The lever H has a two-armed upward extension $h^3$ beyond its pivot $h^4$, which extension $h^3$ terminates with forwardly-turned ends $h^5$, formed with vertical notches $h^7$, as best shown in Fig. 11. A spring $h^6$ is employed to keep the lever H pressed against the cam-wheel F. In Fig. 7 the lever H is shown in its central position and in Figs. 9 and 10 in its two extreme positions. Pivoted by pins $i^4$ to the sides of the outer case E is a narrow transverse bar I, having also notched ends $i^5$, forming fingers $i$, which are adapted to engage in the notches $h^7$ of the ends $h^5$ of the lever extremities $h^3$, as shown in Fig. 11. The notches $h^7$ are of such length that the fingers $i$ will fall into them only when the lever H is in its central position, Figs. 7 and 11; but when the lever H is in either of its extreme positions, Figs. 9 and 10, the fingers $i$ will be supported by the sides of the notches $h^7$, as shown. The lower edge of the bar I is bent inwardly to form a flange or rim $i'$ for the purpose of pressing down the edge of the exposed film into the case when the fingers $i$ fall into the notches $h^7$, as hereinafter set forth. Springs $i^2$, fixed to the outer case E, press upon the bar I and keep it pressed inward. The bar I has also two circular holes $i^3$, through which press two studs $j$, fixed upon a flat spring J, which is carried by the front $e^3$ of the outer case E. The studs $j$ press through the holes $i^3$ upon the front of the slide D, so as to prevent the exposed film lying in front thereof from being drawn up by the friction of the slide on its withdrawal, as will be seen later. The bar I is shown in section in Fig. 11 on an enlarged scale. The front $e^3$ carries also two light flat springs K in the sides thereof, which press the film-case toward the back $e$ and insure the stud $h^2$ engaging in the hole $a^2$ of the hindermost film.

The back face of the cam-wheel is marked with figures $m$, as indicated by dotted marks, and in the back of the case E is pierced a hole M, through which they can be seen as the cam rotates.

In order to provide sufficient bearing for the slide D when drawn full out of the case E, the sides of the slide are formed with longitudinal cavities $d^5$, in which are inserted bars O, having a sliding fit therein. These bars are provided with suitable stops (not shown) in order to prevent their being altogether withdrawn. Their lower ends are T-shaped, having projections $o$ at the sides which engage in the grooves or channels $e^{13}$, formed in the sides of the case E and when the slide D is fully withdrawn come in contact with the stops $e^{14}$, so as to limit its further withdrawal.

In order to prevent the slide D from being withdrawn when all the films have been exposed, we fix to the inside face of one of the bars O an inwardly-curved spring P, having side projections $p$ upon its free end, which spring bears against the one edge by means of its free end of the film left behind in the case E upon the withdrawal of the slide D. A stop $p'$ is fixed to the back, say, of the case E, and when the slide is being withdrawn without a film being left in the case E the end of the spring, having free play, comes in contact with the said stop $p'$, and thereby prevents the slide from being further withdrawn. It is necessary, however, to insure that the bar O, to which the spring P is fixed, remain stationary while the slide is being withdrawn until the spring P is withdrawn from the cavity $d^5$, and to this end to the side of the case E is fixed a spring-strut Q, which detains the bar O by pushing against with the projections $p$ until the spring P is released by the withdrawal of the bar O from the cavity $d^5$, when the spring P slips out of contact with the said strut Q.

For the purpose of insuring that the slide D shall be fully withdrawn or depressed each time a small eccentric cam R is mounted upon the case E in contact with the slide D, preferably at one side and at the upper end thereof, as shown, and two release-notches $r$ for the purpose of reversing the cam are provided upon the corresponding edge of the slide and respectively located at the upper and lower points of its travel, as shown. By this means the slide cannot be reversed until the end of each stroke.

The system under which our improved change-box is used commences first with the packing of the films in the film-case. The films are distributed packed in these cases from the factory in which the films are produced instead of being packed in cardboard boxes or packets, as heretofore. The films are inserted into the film-case when it is opened out in a certain order, a film having the hole upon one side of its longitudinal center always being placed next to one having its hole on the other side of the center or right and left hand, as illustrated in Fig. 12, and each film having its notches $a$ engaging with the swellings $b^7$ of the film-case B. The latter holds, say, one dozen films, and after these and the before-mentioned metal blank are inserted it is closed up, the cap $b$ applied, and the whole sealed up with a suitable paper label or cover.

For the purpose of making exposures of the films in the camera and afterward sealing up the films in the film-case again the latter is inserted into the change-box while the slide D is home through the door $e^2$ after the slide $e^9$ has been withdrawn and after the bar C has been attached to the film-case by the ears $b^4$ and the door closed. The end of the screwed stud $c'$ is now pressing against the bottom of the nut $d^2$, which upon being turned around engages with the stud $c'$ and draws the film-case home into the slide, the stud $h^2$ of the finger $h'$ springs into the hole $a^2$ of the undermost film, the clearance-notch $d^4$ in the lower rear edge of the film-case permitting this, and the cap $b$ of the film-case, having been detained by the stops $e^7$, is left behind in the outer case E. The metal slide $e^9$ is now inserted and pressed home through the slot $e^{11}$. Upon now drawing out the slide D the undermost film, held by the stud $h^2$ of the finger H, is withdrawn from the film-case and remains in the outer case E and by means of the springs $e^{12}$ is pressed forward against the exposure-aperture in the open front $e^3$ of the case E and free of the slide D. Upon now depressing the slide D the film is held flat between it and the open frame $e^4$. As the slide D is forced home into the case one of the projections $o$ presses back the spring $g^3$ and draws back the pawl G, thereby turning the cam F one tooth, which moves the finger so that its stud $h^2$ is half-way between the hole in one film and that in the next. This is the position of the finger when the film is exposed, and the notches $h^7$ of the turned-up ends $h^5$ of the cross-bar $h^3$ are now directly underneath the fingers $i$ of the bar I. Upon the next outward stroke of the slide D the finger $h'$ is inoperative, and when the slide D is withdrawn the second time and has reached the end of its stroke the fingers $i$ of the bar I are forced by the springs $i^2$ into the notches $h^7$, so that the bar I presses upon the top edge of the exposed film A and bends it inward below the front edge of the film-case, as shown in Fig. 11. Upon now pressing home the slide D a second time the exposed film is taken into the film-case as the convex projections $b^6$ cause the front film in the film-case to stand away from the front of the latter and leave room for the exposed film to enter. The same movement of the slide D lifts the fingers $i$ of the bar I clear of the notches $h^7$ in the ends $h^5$, and as this movement is continued the cam F is again operated, and the finger H, with its stud $h^2$, is brought into line to engage the hole in the next film. After all the films have been drawn out of the film-case, exposed, and returned thereinto the metal slide $e^9$ is withdrawn and the nut $d^2$ is unscrewed, thereby forcing the film-case into its cap again, when it may be withdrawn and another inserted in a similar manner.

Before charging the slide D with a film-case the slide $e^9$ is withdrawn and afterward inserted, separating the cap $b$ from the film-case B and forming a rest for the bottom edges of the films while being withdrawn.

The studs $j$ upon the spring J press upon the front side of the slide D and prevent the exposed film from being lifted or drawn up by the friction of the slide D as the latter is being withdrawn on the third stroke by getting behind the top edge of the film.

When the change-box is adapted for glass plates instead of celluloid or films, the internal swellings $b^7$ of the case are made flexible or consist of light springs which spring in and out of the notches $a$ of the plates as they are pushed into position in the magazine, or in place of the said swellings $b^7$ rubber, felt, or the like strips are cemented in the sides of the magazine in order to enable the plates, which come in contact with such strips by their edges, to remain in suspension in the magazine.

We claim—

1. In a magazine plate-holder, an exposure-frame consisting of a casing, a hollow slide therein adapted to contain sensitized films or plates, said casing having an exposure-aperture in the front side thereof, means for exposing a film at said aperture, and means for restoring said film to the interior of the hollow slide when the slide is withdrawn and pushed back.

2. In a magazine plate-holder, an exposure-frame consisting of a casing having an exposure-aperture, a hollow slide therein adapted to contain sensitized films or plates, means for extracting a film from the slide on its withdrawal, and means for pressing said film against the exposure-aperture upon its return movement.

3. In a magazine plate-holder, an exposure-frame consisting of a casing having an exposure-aperture, a hollow slide therein adapted to contain sensitized films or plates, means for extracting a film from the slide upon its withdrawal, means for pressing said film against the exposure-aperture upon its return movement, and means for reinserting the film in the slide upon its second withdrawal and return movement.

4. In a magazine plate-holder, an exposure-frame consisting of a casing having an exposure-aperture, a hollow slide therein adapted to contain sensitized films, means for withdrawing a film at the back of the slide upon the withdrawal thereof, means for pressing the film against the exposure-aperture upon the reinsertion of the slide in the casing, and means for pressing the upper edge of the film inwardly upon the second withdrawal of the slide, so that upon its second return movement the exposed film reënters the hollow slide at the front.

5. In a magazine plate-holder, a combined exposure-frame and change-box, consisting of a casing, a hollow slide therein, a film-case having an open end, a cover adapted to close said open end, means upon the hollow slide for drawing the film-case into the same, and means for detaining the cover in the external casing and thereby stripping it from the film-case when the latter is drawn into the hollow slide.

6. In a magazine plate-holder, a combined exposure-frame and change-box consisting of a casing, a hollow slide therein, a film-case closed at the top and sides and adapted to hold a number of sensitized films or plates, a cover adapted to close the open end of the film-case, a screw detachably connected to the top end of the film-case, a nut revolubly fixed to the top of the hollow slide and adapted to engage the said screw, and stops upon said casing adapted to detain the said cover when the film-case is drawn into the hollow slide.

7. In a magazine plate-holder, the combination with an outer casing and a hollow slide therein open at the bottom, of a film-case closed at the top and sides and adapted to hold sensitized films, perforated lugs attached to the top of the film-case, a bar adapted to engage in the perforations of said lugs, a screw fixed to the said bar and a spring adapted to hold said screw in the plane of the film-case, and a nut revolubly fixed to the top of the hollow slide and adapted to engage with the said screw.

8. A combined exposure-frame and change-box for photographic cameras consisting of a casing, a hollow slide therein open at the bottom, a film-case fitting into the said hollow slide, a cover for the film-case, means upon said casing for detaining the cover in the casing, means for drawing the film-case into the hollow slide so as to strip off the cover, means operated by the withdrawal and reinsertion of the hollow slide for withdrawing a film from the case, pressing it against the exposure-aperture, returning it again to the film-case, and means for pushing the film-case back into its cover and releasing it from the hollow slide.

9. A combination exposure-frame and change-box for a camera, consisting of a casing having an exposure-aperture, a hollow slide therein open at the bottom, a film-case fitting into the said hollow slide, a cover for the film-case, means upon the casing for detaining the cover in said casing, means for drawing the film-case into the hollow slide so as to strip off the cover therefrom, means for withdrawing a film from the film-case upon the withdrawal of the hollow slide, means for pressing a film against the exposure-aperture upon the reinsertion of the slide, means for causing a film to reënter the film-case upon the second withdrawal and reinsertion of the slide, and means for pushing the film-case again into its cover and releasing it from the slide.

10. A combined exposure-frame and change-box for a camera, consisting of a casing having an exposure-aperture, a hollow slide therein open at the bottom, a film-case adapted to contain sensitized films or plates and fitting into said hollow slide, a lever attached to the casing having a springing stud adapted to enter non-central holes in the films, and means operated by the withdrawal and reinsertion of the slide whereby said lever is moved so that said stud alternately engages with one of the non-central holes and is disengaged therefrom at each insertion of the slide.

11. A combined exposure-frame and change-box for a camera consisting of a casing, a hollow slide therein open at the bottom, a film-case having an unattached cover and adapted to contain sensitized films and fitting into said hollow slide, a cover for the film-case, means for drawing the film-case into the slide and stripping off its cover, a lever fulcrumed on said casing and having a springing stud adapted to enter a non-central hole in the sensitized films contained in the film-case, mechanism operated by the drawing out and pushing in of the said hollow slide and adapted to actuate said lever so as to move it at each alternate inpush of the slide into a position in which the stud can engage the hole of one of the films and hold it while the slide is drawn out, while by the intermediate inpush the lever is moved so that the stud will not engage a film, a spring-pressed cross-bar mounted on a pivot and having a projecting flange adapted to push inwardly the top of the film, a two-armed extension on said lever above the fulcrum, with notched ends adapted by the movement of the lever to arrest said cross-bar when the slide is drawn out for the extraction of a film from the case and to liberate said cross-bar when the slide is drawn out to return the film to the case after exposure.

12. A combined exposure-frame and change-box for a camera, consisting of a casing having an exposure-aperture, a hollow slide therein open at the bottom, a film-case adapted to contain sensitized films or plates and fitting into said hollow slide, a projecting cover for the film-case, stops to hold the cover in the casing so as to strip it from the film-case when the latter is drawn into the hollow slide, means for drawing the film-case into the hollow slide, a lever attached to the casing having a springing stud adapted to enter non-central holes in the films, means operated by the withdrawal and reinsertion of the slide, whereby said lever is moved so that the stud engages one of the non-central holes at each alternate inpush of the slide, and means consisting of resilient projections upon the inside of the film-case adapted to engage corresponding notches in the films, so as to prevent more than one film from being detached and withdrawn from the case at one time.

13. An exposure-frame for photographic cameras having a hollow slide therein adapted to hold sensitized films, mechanism actuated by the said slide in sliding in and out for withdrawing the films from the slide and guiding them in again one by one before and after exposure, guide-bars adapted to slide in pockets formed in the said slide and having projections at their ends adapted to slide in grooves of the exposure-frame, substantially as described.

14. In a magazine plate-holder, a combined exposure-frame and change-box consisting of a casing having an exposure-aperture adapted to receive a sensitized film, and a hollow slide in the casing open at its bottom side and having a revolubly-fixed nut upon its top side, a film-case having an open bottom adapted to contain a number of sensitized films and to fit inside said slide and having a detachably-connected screwed stud upon its top side adapted to engage with said revolubly-fixed nut, and a light-proof cap with prominent edges to fit over its open bottom before it is pushed home in the slide, stops in the bottom of the casing adapted to bear against the prominent edges of the cap, a sliding plate in the casing above said stops, a light-proof door in the bottom of the casing adapted to cover the film-case and cap, a transverse bar hinged to the casing near the upper end and having a flange adapted to press inwardly the top edge of the film, mechanism operated by the sliding in and out of the said slide consisting of a lever pivoted to the casing and having a springing stud adapted to enter non-central holes in the bottom edges of the films, an extension upon the lever above the fulcrum with notched ends adapted to support and free said hinged transverse bar, a revolubly-fixed polygonal toothed cam, a pawl carried by a depending springing bar arranged in the path of the slide to engage the teeth of the cam and turn it, and a nose upon the lever acting as a pawl to engage the cam-teeth, whereby the lever is moved step by step backward and forward by the polygonal face of the cam, so that upon alternate depressions of the slide the stud seizes a film, and upon the intermediate withdrawal strokes of the slide the lever releases the transverse bar, which then presses in the top end of the film, and the following depression takes it into the film-case again, substantially as set forth.

15. In a magazine plate-holder, a combined exposure-frame and change-box, consisting of a casing having a hollow slide therein adapted to contain a number of sensitized films, a toothed cam-wheel rotatably mounted in the back of the casing, a pawl adapted to engage the toothed cam-wheel, a depending swinging strip fixed to one side of the casing in a groove therein and carrying a pawl and outwardly pressed into the path of the said slide so as to be operated thereby on its descent to turn the cam-wheel, a lever fulcrumed to the back of the casing above the cam-wheel and having an outwardly-projecting end carrying a springing stud upon its face adapted to engage the films, said lever having also a nose bearing against the toothed cam-wheel against which it is resiliently held, and a two-armed extension above its fulcrum, each arm of which terminates in a notched upturned end, a transverse rocking bar pivoted at its ends to the slide, and provided with an inwardly-projecting flange, and end fingers adapted to bear against and to be supported by the notched upturned ends of the lever extension, and a longitudinal spring fixed to the side of the casing above said transverse rocking bar and carrying studs at its ends which project through holes in the rocking bar and bear against the slide.

16. An exposure-frame and change-box for a camera consisting of an internal casing having a rabbeted opening $e^4$ upon its front side adapted to receive a sensitized film for exposure, a closed hollow member D sliding therein and having an open bottom $d$ and bearing a revolubly-fixed nut $d^2$ in its top side, a film-case B open at the bottom and adapted to contain sensitized films and to fit inside the hollow slide D and bearing a detachably-connected screwed stud $c'$ adapted to engage with the nut $d^2$, a cap $b$ adapted to cover the open end of the said film-case and having overlapping edges $b^9$, a light-proof door $e^2$ covering the lower end of the exposure-frame, a cross-slide $e^{11}$ in the lower part of the casing at a distance above said door $e^2$ to admit said cap $b$, stops $e^7$ upon the side of the casing adapted to engage the edges $b^9$ of the cap $b$ and detain the cap in the outer compartment, plate-springs $e^{12}$ adapted to press the film toward the exposure-aperture $e^3$, a toothed hexagonal cam-wheel F rotatably mounted in the back of the casing, a pendulous springing bar $g^3$ fixed by its upper end in a groove of the casing and in the path of the slide D and bearing at its lower end a pawl G engaging the teeth of the said cam-wheel, a lever H fulcrumed upon the back of the casing above the said cam-wheel and bearing a nose $h$ which is pressed against the cam-wheel by the spring $h^6$, said lever H having also an outwardly-extending arm with a springing tip $h'$ and an upstanding stud $h^2$ thereon, said lever H having further a two-armed extension $h^3$ above said fulcrum with notched upturned ends $h^5$, and a transverse bar I pivoted at its ends to the sides of the casing, and having fingers $i$ adapted to rest upon the ends $h^5$ of the lever H and engage in the depressions therein, substantially as set forth.

17. In a combined exposure-frame and change-box adapted to contain a number of sensitized films or plates and expose them successively to the action of light, the combination of a casing, a hollow sliding member D therein adapted to contain the films or plates, means for withdrawing the films from the sliding member, and mechanism for preventing the withdrawal of the sliding member after all the films have been exposed, consisting of a bar O sliding in a longitudinal cavity in the slide D, a spring P fixed at one end upon the bar O and carrying at its other end a projection $p$ which is normally held by the spring P at a distance from the bar O but is adapted to fold against the said bar O when the latter slides into the cavity within the slide D, and a stop $p'$ adapted to engage said projection $p$ so as to prevent the withdrawal of the slide D, whereby when a film is withdrawn from the slide D it will keep the projection $p$ pressed inwardly and out of the way of the stop $p'$, but when there is no film withdrawn from the slide D said projection $p$ will engage the stop $p'$ and prevent the withdrawal of the slide D.

18. In a combined exposure-frame and change-box adapted to hold a number of sensitized films or plates and expose them successively to the action of light, the combination of a casing, a hollow sliding member D therein adapted to contain the films or plates, means for withdrawing the films successively from the slide D, and mechanism for preventing the withdrawal of the sliding member after all the films have been exposed, consisting of a bar O sliding in a longitudinal cavity in the slide D, a spring P fixed at one end upon the bar O and carrying at its other end a projection $p$ which is normally held by the spring P away from the bar O but is adapted to be folded against the bar O when the latter slides into the cavity within the slide D, a stop $p'$ adapted to engage said projection $p$ so as to prevent the withdrawal of the slide D, and a second stop Q carried by the casing below the stop $p'$ to engage the projection $p$ when the latter is drawn within the cavity of the slide D and pressed against the bar O, so as to insure the withdrawal of the said bar O from the cavity at the first outward movement of the slide D.

19. A film-case adapted for use in a combined exposure-frame and change-box consisting of a case open at the bottom and having resilient internal projections $b^7$ adapted to engage the edges of the films and prevent their withdrawal except individually.

20. A film-case adapted for use in a combined exposure-frame and change-box consisting of a case open at the bottom and having internal swellings $b^6$ adapted to press upon the flat side of the films so as to leave a space between the uppermost film and the side of the case.

21. A film-case adapted for use in a combined exposure-frame and change-box consisting of a case open at the bottom and having a resilient internal projection $b^7$ adapted to engage the edges of the films and prevent them from being withdrawn except individually, and one or more internal swellings $b^6$ near the lower open end of the said case adapted to press upon the uppermost film so as to leave a space between it and the said case.

22. A film-case adapted for use in a combined exposure-frame and change-box consisting of a box having a lower open end covered by a light-proof cap and ears formed upon its upper end whereby it may be drawn into the exposure-frame.

In witness whereof we have hereunto set our hands in the presence of two witnesses.

ARTHUR AUGUSTUS BROOKS.
GEORGE ANDREW WATSON.

Witnesses:
P. H. MOTT,
R. J. URQUHART.